United States Patent
Xu

(10) Patent No.: US 12,015,983 B2
(45) Date of Patent: Jun. 18, 2024

(54) METHOD FOR TRANSMITTING POWER-SAVING INFORMATION, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 333 days.

(21) Appl. No.: 17/536,117

(22) Filed: Nov. 29, 2021

(65) Prior Publication Data
US 2022/0086762 A1 Mar. 17, 2022

Related U.S. Application Data

(63) Continuation of application No. PCT/CN2019/089694, filed on May 31, 2019.

(51) Int. Cl.
*H04W 52/02* (2009.01)
*H04W 72/044* (2023.01)
(Continued)

(52) U.S. Cl.
CPC ..... *H04W 52/0235* (2013.01); *H04W 72/044* (2013.01); *H04W 72/542* (2023.01);
(Continued)

(58) Field of Classification Search
CPC ........... H04W 52/0235; H04W 72/044; H04W 72/542; H04W 76/28; H04W 72/23;
(Continued)

(56) References Cited

U.S. PATENT DOCUMENTS

| | | | |
|---|---|---|---|
| 2017/0366377 A1 | 12/2017 | Papasakellariou | |
| 2017/0367040 A1* | 12/2017 | Sakai | H04W 84/12 |
| 2022/0240187 A1* | 7/2022 | Guo | H04L 5/0053 |

FOREIGN PATENT DOCUMENTS

| | | |
|---|---|---|
| CN | 104581908 | 4/2015 |
| CN | 109196935 | 1/2019 |

(Continued)

OTHER PUBLICATIONS

"International Search Report (Form PCT/ISA/210) of PCT/CN2019/089694," mailed on Feb. 26, 2020, with English translation thereof, pp. 1-4.
"Written Opinion of the International Searching Authority (Form PCT/ISA/237) of PCT/CN2019/089694," mailed on Feb. 27, 2020, with English translation thereof, pp. 1-9.
(Continued)

*Primary Examiner* — Kiet Tang
(74) *Attorney, Agent, or Firm* — JCIP GLOBAL INC.

(57) ABSTRACT

Embodiments of the disclosure disclose a method for transmitting power-saving information, a terminal device, and a network device. The method includes: a terminal device receiving indication information, wherein the indication information is used to indicate the position of power-saving information of the terminal device in downlink control information (DCI); and the terminal device acquiring, according to the indication information, the power-saving information of the terminal device from the DCI. According to the method, the terminal device, and the network device in the embodiments of the disclosure, the power-saving information is carried in the DCI, the standardized workload is reduced, and a PDCCH shows good compatibility and multiplexing characteristics with respect to various other channels such as a PDSCH.

15 Claims, 3 Drawing Sheets

(51) Int. Cl.
　　　*H04W 72/542*　　(2023.01)
　　　*H04W 76/28*　　(2018.01)
　　　*H04B 7/06*　　(2006.01)
　　　*H04W 72/23*　　(2023.01)

(52) U.S. Cl.
　　　CPC .......... *H04W 76/28* (2018.02); *H04B 7/0626* (2013.01); *H04W 72/23* (2023.01)

(58) Field of Classification Search
　　　CPC ............ H04W 52/0229; H04W 84/12; H04W 52/0225; H04B 7/0626; H04L 5/0091; H04L 5/0053; Y02D 30/70
　　　See application file for complete search history.

(56) References Cited

FOREIGN PATENT DOCUMENTS

| EP | 3952478 | 2/2022 |
|----|---------|--------|
| WO | 2019033017 | 2/2019 |
| WO | 2019095331 | 5/2019 |

OTHER PUBLICATIONS

"Office Action of Europe Counterpart Application", issued on Sep. 12, 2022, p. 1-p. 5.
VIVO, "PDCCH-based power saving signal/channel", 3GPP TSG RAN WG1 #97 R1-1906170, May 13-17, 2019, pp. 1-10.
Intel Corporation, "Considerations on PDCCH-based power saving signal", 3GPP TSG-RAN WG1 #97 R1-1906819, May 13-17, 2019, pp. 1-10.
"Search Report of Counterpart Europe Application No. 19930354.6", issued on Apr. 7, 2022, p. 1-p. 12.

\* cited by examiner

| Indicator field 0 | Indicator field 1 | Indicator field 2 | Indicator field 3 | Indicator field 4 | Indicator field 5 | Indicator field 6 | Indicator field 7 |
|---|---|---|---|---|---|---|---|
| User 0 | User 1 | User 2 | User 3 | User 4 | User 5 | User 6 | User 7 |

DCI

FIG. 3

| Indicator field 0 | Indicator field 1 | Indicator field 2 | Indicator field 3 | Indicator field 4 | Indicator field 5 | Indicator field 6 | Indicator field 7 |
|---|---|---|---|---|---|---|---|
| User 0 | User 1 | User 2 | User 3 | User 4 | User 5 | User 6 | User 7 |

DCI

FIG. 4

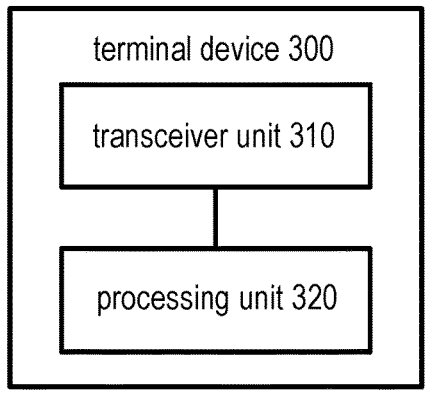
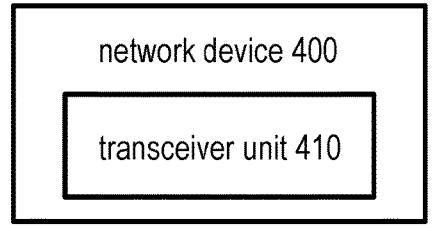
FIG. 6
FIG. 5
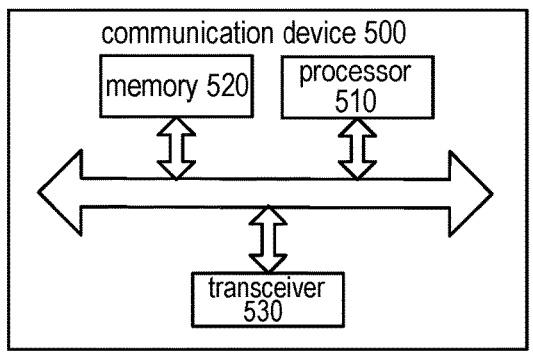
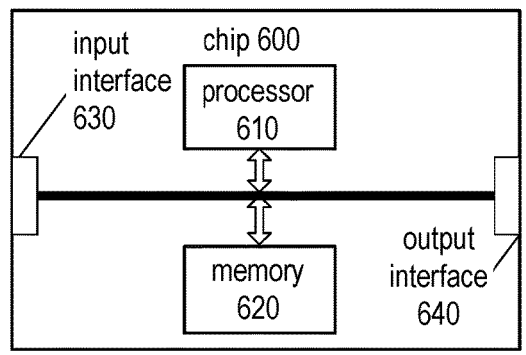
FIG. 7
FIG. 8
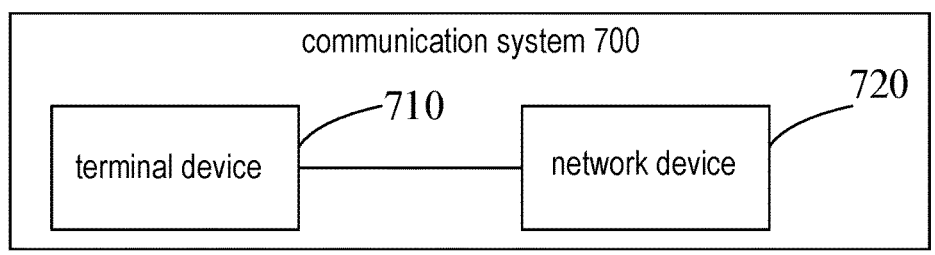
FIG. 9

METHOD FOR TRANSMITTING POWER-SAVING INFORMATION, TERMINAL DEVICE, AND NETWORK DEVICE

CROSS-REFERENCE TO RELATED APPLICATION

This application is a continuation of international PCT application serial no. PCT/CN2019/089694, filed on May 31, 2019. The entirety of the abovementioned patent application is hereby incorporated by reference herein and made a part of this specification.

BACKGROUND

Field of the Disclosure

The embodiments of the disclosure relate to the field of communications, and in particular to a method for transmitting power-saving information, a terminal device, and a network device.

SUMMARY OF THE DISCLOSURE

The embodiment of the disclosure provides a method for transmitting power-saving information, a terminal device and a network device. The power-saving information is carried in Downlink Control Information (DCI). The standardized workload is small and the Physical Downlink Control Channel (PDCCH) shows good compatibility and multiplexing characteristics with respect to other various channels such as a Physical Downlink Shared Channel (PDSCH).

In the first aspect, a method for transmitting power-saving information is provided, the method includes: a terminal device receives indication information, the indication information is utilized to indicate the position of the power-saving information of the terminal device in the DCI; the terminal device obtains the power-saving information of the terminal device from the DCI according to the indication information.

In the second aspect, a method for transmitting power-saving information is provided. The method includes: a network device sends indication information to the terminal device, the indication information is utilized to indicate the position of the power-saving information of the terminal device in the DCI.

In the aspect of third-party vendor, a terminal device is provided, which is configured for executing the method described in the first aspect or its implementation.

Specifically, the terminal device includes a functional module for executing the method described in the first aspect or its implementation.

In the fourth aspect, a network device is provided, which is configured to execute the method in the second aspect or its implementation.

Specifically, the network device includes a functional module for executing the method in the second aspect or its implementation.

In the fifth aspect, a terminal device is provided, which includes a processor and a memory. The memory is configured to store a computer program, and the processor is configured to invoke and run the computer program stored in the memory to execute the method in the first aspect or its implementation.

In the sixth aspect, a network device is provided, which includes a processor and a memory. The memory is configured to store a computer program, and the processor is configured to invoke and run the computer program stored in the memory to execute the method in the second aspect or its implementation.

In the seventh aspect, a chip is provided for implementing the method described in any one of the first aspect to the second aspect or its implementation.

Specifically, the chip includes: a processor, which is configured to invoke and run a computer program in the memory, so that the device installed with the chip executes the method described in any one of the first aspect to the second aspect or its implementation.

In the eighth aspect, a computer-readable storage medium is provided for storing a computer program that enables the computer to execute the method described in any one of the first aspect to the second aspect or its implementation.

In the ninth aspect, a computer program product is provided, including a computer program instruction that enables a computer to execute the method described in any one of the first aspect to the second aspect or its implementation.

In the tenth aspect, a computer program is provided. When the computer program is run on a computer, the computer executes the method described in any one of the first aspect to the second aspect or its implementation.

Through the above technical solution, the power-saving information is carried in the DCI. On the one hand, the existing PDCCH design, including coding, scrambling, resource mapping, search space, and control-resource set (CORESET) and so on can be directly multiplexed, such that the standardized workload is small. On the other hand, since the existing system already supports the PDCCH channel, the PDCCH shows good compatibility and multiplexing characteristics with respect to other various channels such as a PDSCH.

These and other aspects of the disclosure will be more comprehensible in the description of the following embodiments.

BRIEF DESCRIPTION OF THE DRAWINGS

FIG. 3 is a schematic block diagram of a DCI carrying power-saving information embodied in an embodiment of the disclosure.

FIG. 4 is another schematic block diagram of a DCI carrying power-saving information embodied in an embodiment of the disclosure.

FIG. 5 is a schematic block diagram of a terminal device embodied in an embodiment of the disclosure.

FIG. 6 is a schematic block diagram of a network device embodied in an embodiment of the disclosure.

FIG. 7 is a schematic block diagram of a communication device embodied in an embodiment of the disclosure.

FIG. 8 is a schematic block diagram of a chip embodied in an embodiment of the disclosure.

FIG. 9 is a schematic view of a communication system embodied in an embodiment of the disclosure.

DESCRIPTION OF EMBODIMENTS

The technical solutions in the embodiments of the disclosure will be described below in conjunction with the drawings in the embodiments of the disclosure. Obviously, the embodiments described below are part of the embodiments of the disclosure, not all of the embodiments. Based on the embodiments in this disclosure, all other embodiments obtained by those of ordinary skill in the art without inventive effort shall fall within the scope to be protected by the disclosure.

It should be understood that the technical solutions in the embodiments of the disclosure can be applied to various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, New Radio (NR) or future 5G system and so on.

In particular, the technical solutions of the embodiments of the disclosure can be applied to various communication systems based on non-orthogonal multiple access technologies, such as Sparse Code Multiple Access (SCMA) system, and Low Density Signature (LDS) system, etc. Certainly, the SCMA system and LDS system can also be called other names in the communication field. Further, the technical solutions in the embodiments of the disclosure can be applied to multi-carrier transmission system using non-orthogonal multiple access technology, such as Orthogonal Frequency Division Multiplexing (OFDM), Filter Bank Multi-Carrier (FBMC), Generalized Frequency Division Multiplexing (GFDM), and Filtered-OFDM (F-OFDM) systems and so on using non-orthogonal multiple access technology.

Figure 1:
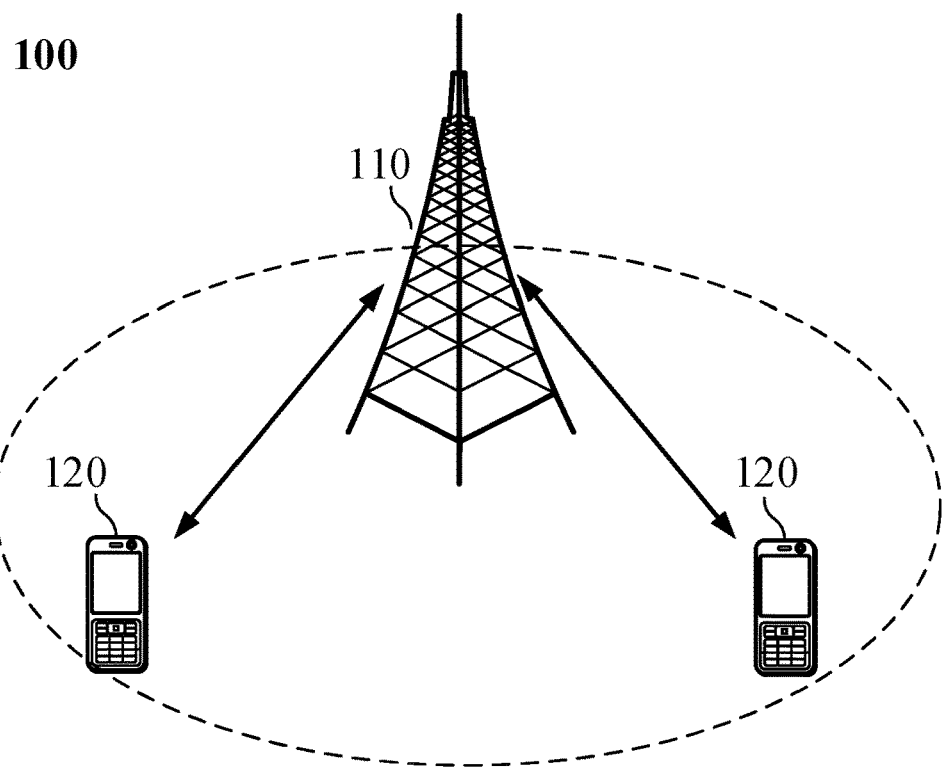
FIG. 1 is a schematic view of a communication system architecture embodied in an embodiment of the disclosure.

Exemplarily, the communication system 100 applied in the embodiment of the disclosure is shown in FIG. 1. The communication system 100 may include a network device 110, and the network device 110 may be a device that communicates with a terminal device 120 (or called a communication terminal or a terminal). The network device 110 can provide communication coverage for a specific geographic area, and can communicate with a terminal device located in the coverage area. In at least one embodiment, the network device 110 may be a Base Transceiver Station (BTS) in a GSM system or a CDMA system, a NodeB (NB) in a WCDMA system, or an Evolutional Node B, eNB or eNodeB in the LTE system, or the wireless controller in the Cloud Radio Access Network (CRAN). Alternatively, the network device can be a mobile switching center, a relay station, an access point, a vehicle-mounted device, a wearable device, a hub, a switch, a bridge, a router, network devices gNB in 5G networks, or network devices in the future evolution of the Public Land Mobile Network (PLMN), etc.

The communication system 100 further includes at least one terminal device 120 located within the coverage area of the network device 110. As used herein, "terminal device" includes but is not limited to User Equipment (UE), access terminal, user unit, user station, mobile station, mobile stage, remote station, remote terminal, mobile device, user terminal, terminal, wireless communication device, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication function, computing devices or other processing devices connected to wireless modems, vehicle-mounted devices, wearable devices, terminal devices in the future 5G network or terminal device in future evolution of the Public Land Mobile Network (PLMN) and so on, the disclosure provides no limitation thereto.

In at least one embodiment, direct terminal connection (Device to Device, D2D) communication may be performed between the terminal devices 120.

In at least one embodiment, the 5G system or 5G network may also be referred to as a New Radio (NR) system or NR network.

FIG. 1 exemplarily shows a network device 110 and two terminal devices 120. In at least one embodiment, the communication system 100 may include multiple network devices 110 and the coverage of each network device 110 may include more or less terminal devices 120. The disclosure provides no limitation thereto.

In at least one embodiment, the communication system 100 may further include other network entities such as a network controller and a mobility management entity, the disclosure provides no limitation thereto.

It should be understood that the devices with communication functions in the network/system in the embodiments of the disclosure may be referred to as communication devices. Taking the communication system 100 shown in FIG. 1 as an example, the communication device may include a network device 110 and a terminal device 120 with communication functions. The network device 110 and the terminal device 120 may be the specific devices described above, and no further description will be incorporated herein. The communication device may further include other devices in the communication system 100, such as a Mobility Management Entity (MME), a Serving Gateway (S-GW) or a Packet Data Gateway (PDN Gateway, P-GW), etc. The disclosure provides no limitation thereto.

It should be understood that the terms "system" and "network" in this disclosure are often used interchangeably in this disclosure. The term "and/or" in this disclosure is only a term describing the association relationship between objects, which means that there can be three types of relationships. For example, A and/or B can mean: there is A only, A and B exist simultaneously, and there is B only. In addition, the character "/" in this disclosure generally indicates that the objects described with "/" are in an "or" relationship.

In consideration of power saving of the terminal device, the existing systems all support the DRX transmission mechanism. The main principle is to achieve discontinuous reception of signals in the time domain through a semi-static configuration. When there is no data transmission, detection of PDCCH may be stopped to reduce power consumption, thereby increasing battery's service life.

For example, in the existing LTE system, the DRX configuration method is to configure a DRX cycle for the UE in the RRC CONNECTED state. The DRX cycle is composed of "Active Time" and "Inactive Time". During the "Active Time" period, the UE monitors and receives the PDCCH (Active Time); during the "Inactive Time" period, the UE does not receive the PDCCH to reduce power consumption (it can also be referred to as the sleep period). In addition, the transmission of paging messages is also a DRX mechanism in the RRC IDLE state. Under the circumstances, the DRX cycle is the cycle of the paging message.

How "Active Time" and "Inactive Time" are formed: Time is divided into successive DRX cycles. Each DRX cycle starts to activate the DRX ON timer, and the UE can detect the PDCCH during Active Time according to the configured Monitoring Occasion (MO). When the UE detects the PDCCH, an inactivity timer may also be activated and refreshed. If the DRX ON timer is not over or the Inactivity Timer is not over yet, the UE is in Active Time. The UE in Active Time needs to detect the PDCCH.

The power-saving mechanism of LTE is also adopted in 5G NR, and the DRX configuration method defined by it adopts the DRX configuration of LTE. In the 5G and LTE evolution projects, the enhancement mechanism of DRX is under discussion. For example, although the network has configured the DRX mechanism for the terminal, the terminal is only scheduled opportunistically during the periodical active time, even when the terminal service load is very low, the terminal will only be scheduled in a few DRX cycles. For the paging message adopting the DRX mechanism, the terminal has fewer opportunities to receive the paging message. In other words, no data scheduling is detected in the PDCCH detections in most active time, so there is room for further optimization. One solution is to send power-saving information to the terminal if the network determines that it needs to schedule the terminal during the on duration of DRX. The power-saving information is configured to wake up the terminal so that the terminal performs PDCCH detection during the on duration of DRX. Otherwise, if the network determines that it is not necessary to schedule the terminal in the on duration of DRX, it can send power-saving information to the terminal, so that the terminal does not perform PDCCH detection in the on duration of DRX.

Figure 2:
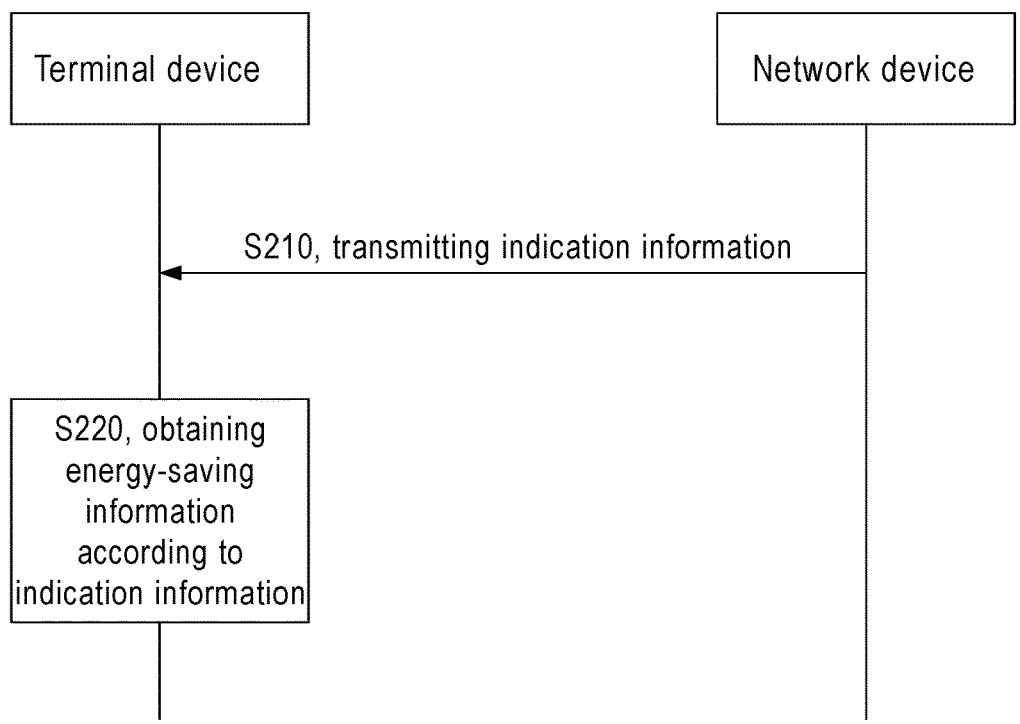
FIG. 2 is a schematic flowchart of a method for transmitting power-saving information embodied in an embodiment of the disclosure.

FIG. 2 shows a schematic block diagram of a method 200 for transmitting power-saving information according to an embodiment of the disclosure. As shown in FIG. 2, the method 200 includes some or all of the following contents.

S210: The network device sends indication information to the terminal device. Correspondingly, the terminal device receives the indication information sent by the network device, and the indication information is used to indicate the position of the power-saving information of the terminal device in the DCI.

S220: The terminal device obtains power-saving information of the terminal device from the DCI according to the received indication information.

Specifically, the power-saving information can be designed based on PDCCH, and PDCCH is used to carry power-saving information. On the one hand, existing PDCCH designs can be directly multiplexed, including coding, scrambling, resource mapping, search space, CORESET, etc. Therefore, the standardized workload is relatively small. On the other hand, since the existing system already supports the PDCCH channel, the PDCCH has good compatibility and multiplexing characteristics with respect to other channels such as the PDSCH. Furthermore, since DCI carries a lot of information, such as uplink and downlink resource configuration information, power control information, etc., or DCI may carry the power-saving information of multiple terminal devices, the terminal device needs to follow the instructions of the network device, so as to obtain its own power-saving information from DCI, such that the position of the power-saving information of the terminal device in the DCI can be configured with flexibility.

The power-saving information carried in the DCI can be referred to as PDCCH-based power-saving information, and the PDCCH-based power-saving information can include PDCCH power-saving information specifically for single user and PDCCH power-saving information multiplexed by multiple users. The PDCCH power-saving information specifically for single user, as the name implies, only carries the power-saving information of one user in the DCI. In the PDCCH power-saving information multiplexed by multiple users, there are more indicator bits in the DCI, that is, the power-saving information of multiple users can be carried, and each user occupies one or more indicator bits in the DCI. The network can configure which indicator bits each user uses. As shown in FIG. 3, DCI includes multiple indicator fields, including indicator fields 0~7. One indicator field is used to carry the power-saving information of one user. It can be seen from the figure that each indicator field has the same length. In other words, the power-saving information of each user occupies the same number of bits. Under the circumstances, the network device only needs to indicate the identification of the power-saving information to the terminal device. For example, the identification can be the starting position of the power-saving information, or which indicator field in the DCI is occupied by the power-saving information, or the identification may further be the position of any bit occupied by the power-saving information, etc. In at least one embodiment, as shown in FIG. 4, the DCI includes multiple indicator fields 0-7, and one indicator field is used to carry the power-saving information of one user. It can be seen from the figure that any two indicator fields may have different lengths. That is to say, the power-saving information of any two users can occupy different numbers of bits. In this case, the network device needs to indicate at least two of the starting position of the power-saving information, the end position of the power-saving information, and the number of bits of the power-saving information to the terminal device. As shown in FIG. 4, the network device can indicate the starting position of the power-saving information and the number of bits of the power-saving information to the terminal device.

It should be noted that, in addition to the function of waking up the terminal device for PDCCH detection, the power-saving information may also have the function of indicating the Bandwidth part (BWP) that is used when the terminal device is awakened, or the power-saving information may also have other functions such as indicating the PDCCH search space that is used when the terminal device is awakened. In other words, power-saving information may include at least one of the following information: wake-up information for the terminal device to perform Physical Downlink Control Channel (PDCCH) detection, indication information of the bandwidth part (BWP) that is used during wake-up, indication information of PDCCH search space that is used during wake-up, configuration information of DRX, cross-slot scheduling enable information, trigger information of Channel State Information (CSI) measurement and reporting as well as indication information of Multiple-Input Multiple-Output (MIMO) layer. It should be understood that the power-saving information in the embodiments of this disclosure should not be limited to the functions listed above. All the indication information that can achieve energy saving for UE should fall within the scope to be protected. For conciseness, no further description will be incorporated herein.

In at least one embodiment, the network device may also only indicate to the terminal device at least one of the starting position of the power-saving information, the end position of the power-saving information, and the number of bits of the power-saving information. For example, the network device can configure at least one of the above various functions for the terminal device in advance. Specifically, the required number of bits can be configured when setting the function. For example, the network device can set that 1 bit is required for waking up the terminal device. If the value of this bit is 1, it means that the terminal device is awakened for PDCCH detection; if the value of this bit is 0, it means that the terminal device continuously stops performing PDCCH detection, or vice versa. In another example, the network device can configure 4 BWPs for the terminal device, and configure 2 bits for BWP indication. In still another example, the network device can configure 8 PDCCH search spaces for the terminal device, and configure 3 bits to indicate the PDCCH search space. In yet another example, the network device can allocate 2 bits to set the DRX, which can specifically include setting the cycle of DRX and so on. In still another example, the network device can allocate 1 bit to indicate cross-slot scheduling. For example, a value of 1 indicates that cross-slot scheduling is enabled, and a value of 0 indicates that it can support simultaneous slot scheduling. In also another example, the network device can allocate 1 bit for the terminal device to trigger CSI measurement and reporting. For example, a value of 1 indicates that CSI measurement and reporting is triggered, and a value of 0 indicates that CSI measurement and reporting is not triggered. In yet another example, the network device can configure 4 MIMO layers for the terminal device, and can indicate the maximum number of MIMO layers that are used by the terminal through 2 bits. In this case, the terminal device can indirectly obtain the number of bits of the power-saving information according to the setting of the above functions. For example, if the terminal device is configured with wake-up function, BWP indication function, and PDCCH search space indication function, the number of bits of the power-saving information is 6. The network device only needs to indicate the starting position or end position to the terminal device to know the positions of all bits of the power-saving information. It should be understood that the terminal device can be configured with some or all of the above functions by the network device, and the embodiment of the disclosure should not be limited thereto.

In at least one embodiment, the terminal device can also indirectly determine any of the starting position, end position, and the number of bits of the power-saving information through other methods, so the network device only needs to indicate the other one of the above to the terminal device.

In at least one embodiment, the network device may also indirectly indicate to the terminal device at least one of the starting position of the power-saving information, the end position of the power-saving information and the number of bits of the power-saving information. For example, the network device can indicate the starting position of the power-saving information and the number of bits of the power-saving information to the terminal device through the power-saving information indicator value. In at least one embodiment, the power-saving information indicator value may be determined according to the total number of bits used to carry power-saving information in the DCI, the number of bits of the power-saving information in the DCI, and the starting position of the power-saving information in the DCI. For example, the power-saving information indicator value is represented by (Power saving information indicator value, PSIIV), the total number of bits used to carry power-saving information in the DCI is represented by $N_{DCI}^{size}$, the starting position of the power-saving information is represented by $bit_{start}$, and the number of bits of the power-saving information is represented by $L_{bits}$. Assume that $(L_{bits}-1) \leq \lfloor N_{DCI}^{size}/2 \rfloor$, then $PSIIV = N_{DCI}^{size}(L_{bits}-1) + bit_{start}$. Assume that $(L_{bits}-1) > \lfloor N_{DCI}^{size}/2 \rfloor$, $PSIIV = N_{DCI}^{size}(N_{DCI}^{size}-L_{bits}+1) + (N_{DCI}^{size}-1-bit_{start})N_{DCI}^{size}$. In the expression, $\lfloor \ \rfloor$ represents a round-down operation. It should be understood that there is not only one method for determining PSIIV, all the calculation methods related to $N_{DCI}^{size}$, $bit_{start}$, and $L_{bits}$ should belong to the scope of the embodiments of the disclosure.

In at least one embodiment, after the terminal device obtains the power-saving information indicator value, the starting position of the power-saving information and/or the number of bits of the power-saving information can be determined by calculation. Further, the terminal device may determine the starting position of the power-saving information and/or the number of bits of the power-saving information according to the power-saving information indicator value and the total number of bits used to carry the power-saving information in the DCI. Specifically, the terminal device can determine $bit_{start}$ and/or $L_{bits}$ according to the magnitude relationship between $\lfloor PSIIV/N_{DCI}^{size} \rfloor + PSIIV \% N_{DCI}^{size}$, and % is the modulo operation. For example, if $(\lfloor PSIIV/N_{DCI}^{size} \rfloor + PSIIV \% N_{DCI}^{size})$ is less than $N_{DCI}^{size}$, $bit_{start} = PSIIV \% N_{DCI}^{size}$ and/or $L_{bits} = \lfloor PSIIV/N_{DCI}^{size} \rfloor + 1$; if $(\lfloor PSIIV/N_{DCI}^{size} \rfloor + PSIIV \% N_{DCI}^{size})$ is greater than or equal to $N_{DCI}^{size}$, $bit_{start} = N_{DCI}^{size} - PSIIV \% N_{DCI}^{size} - 1$ and/or $L_{bits} = N_{DCI}^{size} - \lfloor PSIIV/N_{DCI}^{size} \rfloor + 1$.

In order to facilitate understanding, the whole process of calculating $bit_{start}$ and $L_{bits}$ through PSIIV will be described in details.

First of all, it can be obtained whether it is $(L_{bits}-1) \leq \lfloor N_{DCI}^{size}/2 \rfloor$ or $(L_{bits}-1) > \lfloor N_{DCI}^{size}/2 \rfloor$ through the magnitude relationship between $\lfloor PSIIV/N_{DCI}^{size} \rfloor + PSIIV \% N_{DCI}^{size}$ and $N_{DCI}^{size}$.

If $(L_{bits}-1) \leq \lfloor N_{DCI}^{size}/2 \rfloor$, $\lfloor PSIIV/N_{DCI}^{size} \rfloor + PSIIV \% N_{DCI}^{size} = bit_{start} + L_{bits} - 1 < N_{DCI}^{size}$ (under the circumstances, $PSIIV = N_{DCI}^{size}(L_{bits}-1) + bit_{start}$, and because $bit_{start} + L_{bits} \leq N_{DCI}^{size}$).

If $(L_{bits}-1) > \lfloor N_{DCI}^{size}/2 \rfloor$, $\lfloor PSIIV/N_{DCI}^{size} \rfloor + PSIIV \% N_{DCI}^{size} = 2N_{DCI}^{size} - bit_{start} - L_{bits} \geq N_{DCI}^{size}$.

That is to say, after the terminal device receives the PSIIV, the value of $\lfloor PSIIV/N_{DCI}^{size} \rfloor + PSIIV \% N_{DCI}^{size}$ may be calculated first, and compared with $N_{DCI}^{size}$. If $\lfloor PSIIV/N_{DCI}^{size} \rfloor + PSIIV \% N_{DCI}^{size} < N_{DCI}^{size}$, then $PSIIV = N_{DCI}^{size}(L_{bits}-1) + bit_{start}$ is taken into $PSIIV \% N_{DCI}^{size}$, and $bit_{start} = PSIIV \% N_{DCI}^{size}$ can be obtained just as expected. Similarly, $PSIIV = N_{DCI}^{size}(L_{bits}-1) + bit_{start}$ is taken into $\lfloor PSIIV/N_{DCI}^{size} \rfloor$, and $L_{bits} = \lfloor PSIIV/N_{DCI}^{size} \rfloor + 1$ can be obtained just as expected. If $\lfloor PSIIV/N_{DCI}^{size} \rfloor$, and $L_{bits} = \lfloor PSIIV/N_{DCI}^{size} \rfloor + 1$ can be $N_{DCI}^{size}(N_{DCI}^{size} - L_{bits} + 1) + (N_{DCI}^{size} - 1 - bit_{start})$ is taken into $PSIIV \% N_{DCI}^{size}$, then $bit_{start} = N_{DCI}^{size} - PSIIV \% N_{DCI}^{size} - 1$ can be obtained just as expected. Similarly, $PSIIV = N_{DCI}^{size}(N_{DCI}^{size} - L_{bits} + 1) + (N_{DCI}^{size} - 1 - bit_{start})$ is taken into $\lfloor PSIIV/N_{DCI}^{size} \rfloor$, and $L_{bits} = N_{DCI}^{size} - \lfloor PSIIV/N \% N_{DCI}^{size} \rfloor + 1$ can be obtained just as expected.

It should be understood that the above process is obtained completely based on the assumption that $(L_{bits}-1) \leq \lfloor N_{DCI}^{size}/2 \rfloor$, then $PSIIV = N_{DCI}^{size}(L_{bits}-1) + bit_{start}$; $(L_{bits}-1) > \lfloor N_{DCI}^{size}/2 \rfloor$, $PSIIV = N_{DCI}^{size}(N_{DCI}^{size} - L_{bits} + 1) + (N_{DCI}^{size} - 1 - bit_{start})N_{DCI}^{size}$. If the assumption changes, the obtained $bit_{start}$ and $L_{bits}$ will be different accordingly.

It should be noted that the foregoing embodiment is described based on the assumption that the power-saving information indicator value is determined based on the starting position of the power-saving information, the number of bits of the power-saving information, and the total number of bits used to carry the power-saving information in the DCI, but it should not be construed as a limitation to the disclosure. For example, the power-saving information indicator value may also be determined based on the end position of the power-saving information, the number of bits of the power-saving information, and the total number of bits used to carry power-saving information in the DCI.

It should be understood that the total number of bits used to carry power-saving information in the DCI may be the maximum number of bits that can carry information in the DCI, or less than the maximum number of bits that can carry information in the DCI.

For example, DCI includes the power-saving information of two terminal devices. Specifically, the power-saving information configured by the network device for the first terminal device occupies 2 bits, and the power-saving information configured for the second terminal device occupies 5 bits. The total number of bits used to carry power-saving information in the DCI can be 7. Assume that the two power-saving information are adjacent to each other, the starting position of the first power-saving information is the 0 bit in the DCI, the starting position of the second power-saving information is the second bit in the DCI. Then the network device can determine PSIIV according to $(L_{bits}-1) \leq \lfloor N_{DCI}^{size}/2 \rfloor$ or $(L_{bits}-1) \lfloor N_{DCI}^{size}/2 \rfloor$. For the first terminal device, (2-1)<3, then PSIIV=7 (2-1)+0=7; for the second terminal device, (6-1)>4, then PSIIV=7(7−5+1)+(7−1−2)=25.

When the first terminal device receives PSIIV=7, first calculate $\lfloor 7/7 \rfloor + 7\%7 = 1$, and 1<7, then $bit_{start} = 7\%7 = 0$, $L_{bits} = \lfloor 7/7 \rfloor + 1 = 2$.

When the second terminal device receives PSIIV=25, first calculate $\lfloor 25/7 \rfloor + 25\%7 = 7$ and 7=7, then $bit_{start} 7 - 25\%7 - 1 = 2$, $L_{bits} = 7 - \lfloor 25/7 \rfloor + 1 = 5$.

The above-mentioned power-saving information indicator value is adopted, and the indicator bit overhead of the power-saving information is: $\lceil \log_2(N_{DCI}^{size}(N_{DCI}^{size}+1)/2) \rceil$. In the expression, $\lceil \ \rceil$ represents a round-up operation. For example, in the above embodiment, the required indicator bit overhead of power-saving information is $\lceil \log_2(7(7+1)/2) \rceil = 5$.

With the above embodiment, it is possible to effectively reduce the overhead power-saving information indication.

In at least one embodiment, in this embodiment of the disclosure, the starting position of the power-saving information, the end position of the power-saving information, and the number of bits of the power-saving information can also be directly indicated by the indicator field in the DCI. For example, the DCI can include at least one of the starting position indicator field, the end position indicator field and the bit number indicator field. The starting position indicator field can directly indicate the starting position of power-saving information, and the end position indicator field can directly indicate the end position of power-saving information. The bit number indicator field can directly indicate the number of bits of power-saving information. Specifically, the starting position indicator field and/or the end position indicator field can be represented by $\lceil \log_2(N_{DCI}^{size}) \rceil$ bits, and the bit number indicator field can be represented by $\lceil \log_2(M) \rceil$ bits, and M is the length of the maximum bit number indicator field included in the DCI. For example, DCI includes two power-saving information, then M is the length of the power-saving information that occupies the largest number of bits in the two power-saving information.

In at least one embodiment, in the embodiment of the disclosure, the position of the power-saving information of the terminal device in the DCI can also be indicated through the bit bitmap. Specifically, the bit bitmap is mapped to the total bits used to carry power-saving information in the DCI, and the bit bitmap indicates the position of the power-saving information in the DCI through the value of each bit. For example, a bit bitmap with a length of $N_{DCI}^{size}$ may be adopted to indicate the position of the power-saving information of the terminal device. The network device can set the value of the bit bitmap. For example, the value of the bit in the bit bitmap corresponding to the bit position occupied by the power-saving information of the terminal device can be set as 1, and the value of the bit in the bit bitmap corresponding to the bit position occupied by the power-saving information of the terminal device can be set as 0.

For example, assume $N_{DCI}^{size}=20$, and $N_{DCI}^{size}$ can be the number of bits that can be carried by DCI. For example, when the bit bitmap is "00000011110000000000", it means that the power-saving information of the terminal device occupies the 6th to 10th bits, a total of 4 bits. Of course, the indication mode of the bit bitmap can also indicate one or more non-continuous bits to the terminal device. For example, when the bit bitmap is "00101011000000000000", it means that the power-saving information of the terminal device occupies the 3rd, 5th, 7th, and the 8th bits, a total of 4 bits.

The signaling overhead of the indication mode using the bit bitmap depends on the maximum number of bits that can be carried by the DCI, or the number of bits that can be used for energy saving indication in the DCI.

In at least one embodiment, in the embodiments of the disclosure, the above-mentioned various configuration information and indication information may be sent to the terminal device through Radio Resource Control (RRC) signaling, Medium Access Control Control Element (MAC CE), or system broadcast message.

It should be understood that the interaction between the network device and the terminal device described by the network device and related characteristics and functions correspond to the related characteristics and functions of the terminal device. In addition, the related content has been described in detail in the above method 200, and no further description is incorporated herein for conciseness.

It should be understood that in the various embodiments of the disclosure, the sequence number of the above-mentioned processes does not mean the order of execution. The execution order of each process should be determined by its function and internal logic, and should not be construed as limitation to the implementation of the embodiment in the disclosure.

The foregoing describes in detail the method for switching access network device according to the embodiment of the disclosure. The following will describe the device for transmitting power-saving information according to the embodiment of the disclosure with reference to FIG. 5 to FIG. 7, and the technical feature described in the method embodiment applies to the following device embodiments.

FIG. 5 shows a schematic block diagram of a terminal device 300 according to an embodiment of the disclosure. As shown in FIG. 5, the terminal device 300 includes:

A transceiver unit 310 is configured to receive indication information, and the indication information is used to indicate the position of the power-saving information of the terminal device in the DCI.

A processing unit 320 is configured to obtain the power-saving information of the terminal device from the DCI according to the indication information.

In at least one embodiment, in this embodiment of the disclosure, the indication information is configured to indicate at least one of the starting position, the end position, and the number of bits of the power-saving information in the DCI.

In at least one embodiment, in the embodiment of the disclosure, the indication information indicates the starting position of the power-saving information and/or the number of bits of the power-saving information through an power-saving information indicator value, and the power-saving information indicator value is determined based on the total number of bits used to carry power-saving information in the DCI, the number of bits of the power-saving information in the DCI, and the starting position of the power-saving information in the DCI.

In at least one embodiment, in the embodiment of the disclosure, the power-saving information indicator value is represented by PSIIV, the total number of bits used to carry power-saving information in the DCI is represented by $N_{DCI}^{size}$, the starting position of the power-saving information is represented by $bit_{start}$, and the number of bits of the power-saving information is represented by $L_{bits}$.

If $(L_{bits}-1)$ is less than or equal to $\lfloor N_{DCI}^{size}2 \rfloor$, $PSIIV=N_{DCI}^{size}(L_{bits}-1)+bit_{start}$.

Or if $(L_{bits}-1)$ is greater than $\lfloor N_{DCI}^{size}/2 \rfloor$, $PSIIV=N_{DCI}^{size}(N_{DCI}^{size}-L_{bits}+1)+(N_{DCI}^{size}-1-bit_{start})N_{DCI}^{size}$.

In at least one embodiment, in the embodiment of the disclosure, the processing unit is further configured to: determine the starting position of the power-saving information and/or the number of bits of the power-saving information according to the power-saving information indicator value and the total number of bits used to carry power-saving information in the DCI.

In at least one embodiment, in the embodiment of the disclosure, the power-saving information indicator value is represented by PSIIV, the total number of bits used to carry power-saving information in the DCI is represented by $N_{DCI}^{size}$, the starting position of the power-saving information is represented by $bit_{start}$, and the number of bits of the power-saving information is represented by $L_{bits}$. The processing unit is specifically configured to:

Determine $bit_{start}$ and/or $L_{bits}$ according to the magnitude relationship between $(\lfloor PSIIV/N_{DCI}^{size} \rfloor + PSIIV \% N_{DCI}^{size})$ and $N_{DCI}^{size}$, and $\lfloor \ \rfloor$ represents a round-down operation, and % represents the modulo operation.

In at least one embodiment, in the embodiment of the disclosure, the processing unit is specifically configured to:
If $(\lfloor PSIIV/N_{DCI}^{size} \rfloor + PSIIV \% N_{DCI}^{size})$ is less than $N_{DCI}^{size}$ it is determined that $bit_{start}=PSIIV \% N_{DCI}^{size}$ and/or $L_{bits}=\lfloor PSIIV/N_{DCI}^{size} \rfloor + 1$.

If $(\lfloor PSIIV/N_{DCI}^{size} \rfloor + PSIIV \% N_{DCI}^{size})$ is greater than or equal to $N_{DCI}^{size}$, it is determined that $bit_{start}=N_{DCI}^{size}-PSIIV \% N_{DCI}^{size}-1$ and/or $L_{bits}=N_{DCI}^{size}-\lfloor PSIIV/N_{DCI}^{size} \rfloor + 1$.

In at least one embodiment, in this embodiment of the disclosure, the total number of bits used to carry power-saving information in the DCI is represented by $N_{DCI}^{size}$, and the power-saving information indicator value includes $\lceil \log_2(N_{DCI}^{size}(N_{DCI}^{size}+1)/2) \rceil$ bits, and $\lceil \ \rceil$ represents a round-up operation.

In at least one embodiment, in this embodiment of the disclosure, the indication information includes at least one of a starting position indicator field of the power-saving information, an end position indicator field of the power-saving information, and the bit number indicator field of the power-saving information.

In at least one embodiment, in this embodiment of the disclosure, the starting position indicator field includes $\lceil \log_2(N_{DCI}^{size}) \rceil$ bits and/or the bit number indicator field includes $\lceil \log_2(M) \rceil$ bits. Specifically, $N_{DCI}^{size}$ is the total number of bits used to carry the power-saving information in the DCI, and M is the length of the maximum bit number indicator field in the at least one bit number indicator field included in the DCI. The at least one bit number indicator field comprised in the DCI corresponds to at least one power-saving information comprised in the DCI one-to-one, and $\lceil \ \rceil$ represents a round-up operation.

In at least one embodiment, in the embodiment of the disclosure, the indication information includes a bit bitmap, and the bit bitmap is mapped to the total bits used to carry power-saving information in the DCI, and the bit bitmap indicates the position of the power-saving information in the DCI through the value of each bit.

In at least one embodiment, in the embodiment of the disclosure, the power-saving information indicated by the bit bitmap occupies multiple consecutive or discontinuous bits in the DCI.

In at least one embodiment, in this embodiment of the disclosure, the DCI can carry power-saving information of multiple terminal devices.

In at least one embodiment, in the embodiment of the disclosure, the power-saving information includes at least one of the following information: wake-up information for the terminal device to perform Physical Downlink Control Channel (PDCCH) detection, indication information of the bandwidth part (BWP) that is used during wake-up, indication information of PDCCH search space that is used during wake-up, configuration information of Discontinuous Reception DRX, cross-slot scheduling enable information, trigger information of Channel State Information (CSI) measurement and reporting as well as indication information of Multiple-Input Multiple-Output (MIMO) layer.

In at least one embodiment, in the embodiments of the disclosure, the indication information may be carried in the Radio Resource Control (RRC) signaling, Medium Access Control Control Element (MAC CE), or system broadcast message.

It should be understood that the terminal device 300 according to the embodiment of the disclosure may correspond to the terminal device in the method embodiment of the disclosure, and the above-mentioned operation and other operations and/or functions of each unit in the terminal device 300 are respectively used to implement the corresponding process of the terminal device in the method of FIG. 2. For conciseness, no further description is incorporated herein.

FIG. 6 shows a schematic block diagram of a network device 400 according to an embodiment of the disclosure. As shown in FIG. 6, the network device 400 includes:

A transceiver unit 410 is configured to send indication information to a terminal device, and the indication information is used to indicate the position of the power-saving information of the terminal device in the DCI.

In at least one embodiment, in this embodiment of the disclosure, the indication information is used to indicate at least one of the starting position, the end position, and the number of bits of the power-saving information in the DCI.

In at least one embodiment, in the embodiment of the disclosure, the indication information indicates the starting position of the power-saving information and/or the number of bits of the power-saving information through the power-saving information indicator value. Moreover, the network device further includes: a processing unit which determines the power-saving information indicator value according to the total number of bits used to carry the power-saving information in the DCI, the number of bits of the power-saving information in the DCI and the starting position of the power-saving information in the DCI.

In at least one embodiment, in the embodiment of the disclosure, the power-saving information indicator value is represented by PSIIV, the total number of bits used to carry power-saving information in the DCI is represented by $N_{DCI}^{size}$, the starting position of the power-saving information is represented by $bit_{start}$, and the number of bits of the power-saving information is represented by $L_{bits}$, and the processing unit is specifically configured to:

If ($L_{bits}-1$) is less than or equal to $\lfloor N_{DCI}^{size}/2 \rfloor$, it is determined that PSIIV=$N_{DCI}^{size}(L_{bits}-1)+\text{bit}_{start}$.

If ($L_{bits}-1$) is greater than $\lfloor N_{DCI}^{size}/2 \rfloor$, it is determined that PSIIV=$N_{DCI}^{size}(N_{DCI}^{size}-L_{bits}+1)+(N_{DCI}^{size}-1-\text{bit}_{start})$ $N_{DCI}^{size}$, and $\lfloor \ \rfloor$ represents a round-down operation.

In at least one embodiment, in this embodiment of the disclosure, the total number of bits used to carry power-saving information in the DCI is represented by $N_{DCI}^{size}$, and the power-saving information indicator value includes $\lceil \log_2(N_{DCI}^{size}(N_{DCI}^{size}+1)/2) \rceil$ bits, and $\lfloor \ \rfloor$ represents a round-up operation.

In at least one embodiment, in this embodiment of the disclosure, the indication information includes at least one of a starting position indicator field of the power-saving information, an end position indicator field of the power-saving information, and the bit number indicator field of the power-saving information.

In at least one embodiment, in this embodiment of the disclosure, the starting position indicator field includes $\lceil \log_2(N_{DCI}^{size}) \rceil$ bits and/or the bit number indicator field includes $\lceil \log_2(M) \rceil$ bits. Specifically, the $N_{DCI}^{size}$ is the total number of bits used to carry the power-saving information in the DCI. The M is the length of the maximum bit number indicator field in the at least one bit number indicator field included in the DCI. The at least one bit number indicator field corresponds to at least one power-saving information one-to-one, and r represents a round-up operation.

In at least one embodiment, in the embodiment of the disclosure, the indication information includes a bit bitmap, and the bit bitmap is mapped to the total bits used to carry power-saving information in the DCI, and the bit bitmap indicates the position of the power-saving information in the DCI through the value of each bit.

In at least one embodiment, in the embodiment of the disclosure, the power-saving information indicated by the bit bitmap occupies multiple consecutive or discontinuous bits in the DCI.

In at least one embodiment, in this embodiment of the disclosure, the DCI can carry power-saving information of multiple terminal devices.

In at least one embodiment, in the embodiment of the disclosure, the power-saving information includes at least one of the following information: wake-up information for the terminal device to perform Physical Downlink Control Channel (PDCCH) detection, indication information of the bandwidth part (BWP) that is used during wake-up, indication information of PDCCH search space that is used during wake-up, configuration information of Discontinuous Reception (DRX), cross-slot scheduling enable information, trigger information of Channel State Information (CSI) measurement and reporting as well as indication information of Multiple-Input Multiple-Output (MIMO) layer.

In at least one embodiment, in the embodiments of the disclosure, the indication information may be carried in the Radio Resource Control (RRC) signaling, Medium Access Control Control Element (MAC CE), or system broadcast message.

It should be understood that the network device 400 according to the embodiment of the disclosure may correspond to the terminal device in the method embodiment of the disclosure, and the above-mentioned operation and other operations and/or functions of each unit in the network device 400 are respectively used to implement the corresponding process of the network device in the method of FIG. 2. For conciseness, no further description is incorporated herein.

FIG. 7 is a schematic structural diagram of a communication device 500 embodied in an embodiment of the disclosure. The communication device 500 shown in FIG. 7 includes a processor 510, and the processor 510 can invoke and run a computer program in the memory to implement the method in the embodiment of the disclosure.

In at least one embodiment, as shown in FIG. 7, the communication device 500 may further include a memory 520. The processor 510 can invoke and run a computer program in the memory 520 to implement the method in the embodiment of the disclosure.

The memory 520 may be a separate device independent of the processor 510, or may be integrated in the processor 510.

In at least one embodiment, as shown in FIG. 7, the communication device 500 may further include a transceiver 530, and the processor 510 may control the transceiver 530 to communicate with other devices. Specifically, the transceiver 530 may send information or data to other devices, or receive information or data sent by other devices.

Specifically, the transceiver 530 may include a transmitter and a receiver. The transceiver 530 may further include an antenna, and the number of antennas may be one or more.

In at least one embodiment, the communication device 500 may specifically be a network device of an embodiment of the disclosure, and the communication device 500 may implement the corresponding process implemented by the network device in various methods of the embodiment of the disclosure. For conciseness, no further description will be incorporated herein.

In at least one embodiment, the communication device 500 may specifically be a terminal device of an embodiment of the disclosure, and the communication device 500 may implement the corresponding process implemented by the terminal device in various methods of the embodiment of the disclosure. For conciseness, no further description will be incorporated herein.

FIG. 8 is a schematic structural diagram of a chip in an embodiment of the disclosure. The chip 600 shown in FIG. 8 includes a processor 610, and the processor 610 can invoke and run a computer program in the memory to implement the method in the embodiment of the disclosure.

In at least one embodiment, as shown in FIG. 8, the chip 600 may further include a memory 620. The processor 610 can invoke and run a computer program in the memory 620 to implement the method in the embodiment of the disclosure.

The memory 620 may be a separate device independent of the processor 610, or may be integrated in the processor 610.

In at least one embodiment, the chip 600 may further include an input interface 630. The processor 610 can control the input interface 630 to communicate with other devices or chips, and specifically, can obtain information or data sent by other devices or chips.

In at least one embodiment, the chip 600 may further include an output interface 640. The processor 610 can control the output interface 640 to communicate with other devices or chips, and specifically, can output information or data to other devices or chips.

In at least one embodiment, the chip can be applied to the network device in the embodiments of the disclosure, and the chip can implement the corresponding processes implemented by the network device in the various methods of the embodiments of the disclosure. For conciseness, no further description is incorporated herein.

In at least one embodiment, the chip can be applied to the terminal device in the embodiment of the disclosure, and the chip can implement the corresponding process implemented by the terminal device in various methods of the embodiment of the disclosure. For conciseness, no further description is incorporated herein.

It should be understood that the chip mentioned in the embodiment of the disclosure may also be referred to as a system-level chip, a system chip, a chip system, or a system-on-chip.

FIG. 9 is a schematic block diagram of a communication system 700 according to an embodiment of the disclosure. As shown in FIG. 9, the communication system 700 includes a terminal device 710 and a network device 720.

Specifically, the terminal device 710 can be used to implement the corresponding functions implemented by the terminal device in the above method, and the network device 720 can be used to implement the corresponding functions implemented by the network device in the above method. For conciseness, no further details are incorporated herein.

It should be understood that the processor of the embodiment of the disclosure may be an integrated circuit chip, which has signal processing capabilities. In the implementation process, the steps of the above method embodiments can be completed by integrated logic circuits of hardware in the processor or instructions in the form of software. The processor may be a general-purpose processor, a Digital Signal Processor (DSP), an Application Specific Integrated Circuit (ASIC), an on-shelf Field Programmable Gate Array (FPGA), or other programmable logic devices, discrete gates or transistor logic devices, discrete hardware components. The methods, steps, and logical block diagrams disclosed in the embodiments of the disclosure can be implemented or executed. The general-purpose processor may be a microprocessor or the processor may also be any conventional processor or the like. The steps of the method disclosed in the embodiments of the disclosure can be directly embodied as being executed by a hardware decoding processor, or executed by a combination of hardware and software modules in the decoding processor. The software module can be located in random memory, flash memory, read-only memory, programmable read-only memory, or electrically readable and writable programmable memory, registers, and other well-developed storage media in the field. The storage medium is located in the memory, and the processor reads the information in the memory and completes the steps of the above method in combination with its hardware.

It can be understood that the memory in the embodiments of the disclosure may be volatile memory or non-volatile memory, or may include both volatile and non-volatile memory. Specifically, non-volatile memory can be Read-Only Memory (ROM), Programmable ROM (PROM), Erasable PROM (EPROM), Electrically EPROM (EEPROM) or flash memory. The volatile memory may be a Random Access Memory (RANI), which is used as an external cache memory. By way of exemplary but not restrictive description, many forms of RAM may be adopted, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM) and Direct Rambus RAM (DR RAM). It should be noted that the memory of the systems and methods described herein is intended to include but not limited to these and any other types of memory applicable.

It should be understood that the above-mentioned memory is exemplary but not limited thereto. For example, the memory in the embodiment of the disclosure may also be static RAM (SRAM), dynamic RAM (DRAM), synchronous DRAM (SDRAM), double data rate SDRAM (DDR SDRAM), enhanced SDRA (ESDRAM), synch link DRAM (SLDRAM), and Direct Rambus RAM (DR RAM), etc. That is to say, the memory in the embodiments of the disclosure is intended to include but not limited to these and any other types of memory applicable.

The embodiment of the disclosure further provides a computer-readable storage medium for storing computer programs.

In at least one embodiment, the computer-readable storage medium can be applied to the network device in the embodiment of the disclosure, and the computer program enables the computer to execute the corresponding process implemented by the network device in various methods of the embodiment of the disclosure. For conciseness, no further details are incorporated herein.

In at least one embodiment, the computer-readable storage medium can be applied to the terminal device in the embodiment of the disclosure, and the computer program enables the computer to execute the corresponding process implemented by the mobile terminal/terminal device in various methods of the embodiment of the disclosure. For conciseness, no further details are incorporated herein.

The embodiment of the disclosure further provides a computer program product, including computer program instructions.

In at least one embodiment, the computer program product can be applied to the network device in the embodiment of this disclosure, and the computer program instructions enable the computer to execute the corresponding process implemented by the network device in various methods of the embodiment of this disclosure. For conciseness, no further details are incorporated herein.

In at least one embodiment, the computer program product can be applied to the terminal device in the embodiment of this disclosure, and the computer program instructions enable the computer to execute the corresponding process implemented by the mobile terminal/terminal device in various methods of the embodiment of this disclosure. For conciseness, no further details are incorporated herein.

The embodiment of the disclosure further provides a computer program.

In at least one embodiment, the computer program can be applied to the network device in the embodiment of the disclosure. When the computer program is run on the computer, the computer executes the corresponding processes implemented by the network device in the various methods of the embodiments of the disclosure. For conciseness, no further details are incorporated herein.

In at least one embodiment, the computer program can be applied to the terminal device in the embodiment of this disclosure. When the computer program is run on the computer, the computer can execute the corresponding process implemented by the terminal device in various methods of the embodiment of this disclosure. For conciseness, no further details are incorporated herein.

Those of ordinary skill in the art may realize that the units and algorithm steps described in the examples in combination with the embodiments disclosed herein can be implemented by electronic hardware or a combination of computer software and electronic hardware. Whether these functions are implemented in the form of hardware or software depends on the specific application and design conditions of the technical solution. Practitioners in the art can use different methods to implement the described functions for each specific application, but such implementation should not be construed as extending beyond the scope of this disclosure.

Those skilled in the art can clearly understand that, for the convenience and conciseness of description, the specific operating process of the system, device and unit described above can be derived from the corresponding process in the foregoing method embodiment, and no further description is incorporated herein.

In the several embodiments provided in this disclosure, it should be understood that the system, device, and method disclosed herein may be implemented in other ways. For example, the device embodiments described above are merely illustrative. For example, the division of the units is only a division of logical function, and there may be other divisions in actual implementation, for example, multiple units or elements may be combined or may be integrated into another system, or some features can be ignored or not implemented. In addition, the mutual coupling or direct coupling or communication connection that is shown or discussed may be indirect coupling or communication connection through some interfaces, devices or units, and may be in electrical, mechanical or other forms.

The units described as separate components may or may not be physically separated, and the components shown as units may or may not be physical units, that is, they may be located in a place, or they may be distributed to multiple network units. Some or all of the units may be selected according to actual needs to achieve the purpose of the solutions of the embodiments.

In addition, the functional units in various embodiments of the disclosure may be integrated into one processing unit, or each unit may exist alone physically, or two or more units may be integrated into one unit.

If the function is implemented in the form of a software functional unit and sold or used as an independent product, it can be stored in a computer readable storage medium. Based on this understanding, the technical solution of the disclosure essentially or the part that contributes to the existing technology or the part of the technical solution can be embodied in the form of a software product. The computer software product is stored in a storage medium, including several instructions which are used to enable a computer device (which may be a personal computer, a server, or a network device, etc.) to execute all or part of the steps of the methods described in the various embodiments of the disclosure. The aforementioned storage medium includes: U disk, removable hard disk, Read-Only Memory (ROM), Random Access Memory (RAM), magnetic disks or optical disks, etc., which can store program codes.

The above are only specific implementations of this application, but the scope to be protected by this disclosure is not limited thereto. Any person skilled in the art can easily think of changes or substitutions within the technical scope disclosed in this disclosure, and the changes or substitutions should fall within the scope to be protected by the disclosure. Therefore, the scope to be protected by the disclosure shall be subject to the scope of claims.

What is claimed is:

1. A method for transmitting power-saving information, comprising:
    receiving, by a terminal device, indication information, wherein the indication information is used to indicate a position of power-saving information of the terminal device in downlink control information (DCI), the indication information is used to indicate at least one of a starting position of the power-saving information, an end position of the power-saving information, a number of bits of the power-saving information in the DCI, the indication information indicates the starting position of the power-saving information and/or the number of bits of the power-saving information through a power-saving information indicator value, and the power-saving information indicator value is determined based on a total number of bits used to carry the power-saving information in the DCI, the number of bits of the power-saving information in the DCI, and the starting position of the power-saving information in the DCI; and
    obtaining, by the terminal device, the power-saving information of the terminal device from the DCI according to the indication information.

2. The method according to claim 1, wherein the indication information comprises at least one of a starting position indicator field of the power-saving information, an end position indicator field of the power-saving information, and a bit number indicator field of the power-saving information.

3. The method according to claim 1, wherein the DCI can carry power-saving information of multiple terminal devices.

4. The method according to claim 1, wherein the power-saving information comprises at least one of the following information: wake-up information for the terminal device to perform Physical Downlink Control Channel (PDCCH) detection, indication information of a bandwidth part (BWP) that is used during wake-up, indication information of PDCCH search space that is used during wake-up, configuration information of Discontinuous Reception (DRX), cross-slot scheduling enable information, trigger information of Channel State Information (CSI) measurement and reporting as well as indication information of Multiple-Input Multiple-Output (MIMO) layer.

5. The method according to claim 1, wherein the indication information is carried in a Radio Resource Control (RRC) signaling, a Medium Access Control Control Element (MAC CE), or a system broadcast message.

6. A method for transmitting power-saving information, comprising:
    determining, by a network device, a power-saving information indicator value according to a total number of bits used to carry power-saving information in downlink control information (DCI), a number of bits of the power-saving information in the DCI, and a starting position of the power-saving information in the DCI; and
    sending, by the network device, indication information to a terminal device, wherein the indication information is used to indicate a position of the power-saving information of the terminal device in DCI, the indication information is used to indicate at least one of the starting position of the power-saving information, an end position of the power-saving information, and the number of bits of the power-saving information in the DCI, the indication information indicates the starting position of the power-saving information and/or the number of bits of the power-saving information through a the power-saving information indicator value.

7. The method according to claim 6, wherein the indication information comprises at least one of a starting position indicator field of the power-saving information, an end position indicator field of the power-saving information, and a bit number indicator field of the power-saving information.

8. The method according to claim 6, wherein the DCI can carry power-saving information of multiple terminal devices.

9. The method according to claim 6, wherein the power-saving information comprises at least one of the following information: wake-up information for the terminal device to perform Physical Downlink Control Channel (PDCCH) detection, indication information of a bandwidth part (BWP) that is used during wake-up, indication information of PDCCH search space that is used during wake-up, configuration information of Discontinuous Reception (DRX), cross-slot scheduling enable information, trigger information of Channel State Information (CSI) measurement and reporting as well as indication information of Multiple-Input Multiple-Output (MIMO) layer.

10. The method according to claim 6, wherein the indication information is carried in a Radio Resource Control (RRC) signaling, a Medium Access Control Control Element (MAC CE), or a system broadcast message.

11. A terminal device, comprising: a processor, a receiver and a memory, wherein the memory is configured to store a computer program, and the processor is configured to invoke and run the computer program stored in the memory, and execute:
receiving indication information through the receiver, wherein the indication information is used to indicate a position of power-saving information of the terminal device in downlink control information (DCI), the indication information is configured to indicate at least one of a starting position of the power-saving information, an end position of the power-saving information, and the number of bits of the power-saving information in the DCI, the indication information indicates the starting position of the power-saving information and/or the number of bits of the power-saving information through an power-saving information indicator value, and the power-saving information indicator value is determined based on a total number of bits used to carry the power-saving information in the DCI, the number of bits of the power-saving information in the DCI, and the starting position of the power-saving information in the DCI; and
obtaining the power-saving information of the terminal device from the DCI according to the indication information.

12. The terminal device according to claim 11, wherein the indication information comprises at least one of a starting position indicator field of the power-saving information, an end position indicator field of the power-saving information, and a bit number indicator field of the power-saving information.

13. The terminal device according to claim 11, wherein the DCI can carry power-saving information of multiple terminal devices.

14. The terminal device according to claim 11, wherein the power-saving information comprises at least one of the following information: wake-up information for the terminal device to perform Physical Downlink Control Channel (PDCCH) detection, indication information of a bandwidth part (BWP) that is used during wake-up, indication information of PDCCH search space that is used during wake-up, configuration information of Discontinuous Reception (DRX), cross-slot scheduling enable information, trigger information of Channel State Information (CSI) measurement and reporting as well as indication information of Multiple-Input Multiple-Output (MIMO) layer.

15. The terminal device according to claim 11, wherein the indication information is carried in a Radio Resource Control (RRC) signaling, a Medium Access Control Control Element (MAC CE), or a system broadcast message.

* * * * *